(12) United States Patent
Gawinski et al.

(10) Patent No.: US 8,302,945 B2
(45) Date of Patent: Nov. 6, 2012

(54) COVER ASSEMBLY FOR A VEHICLE AIR SPRING

(75) Inventors: Hubertus Gawinski, Lauenau (DE); Christoph Bank, Lehrte (DE); Hans Werner Kopplow, Nümbrecht (DE); Rolf Steinbach, Gummersbach (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 581 days.

(21) Appl. No.: 12/382,213

(22) Filed: Mar. 11, 2009

(65) Prior Publication Data
US 2009/0278289 A1    Nov. 12, 2009

Related U.S. Application Data

(63) Continuation-in-part of application No. PCT/EP2007/059451, filed on Sep. 10, 2007.

(30) Foreign Application Priority Data

Sep. 14, 2006   (DE) .................... 10 2006 043 957

(51) Int. Cl.
*F16F 9/04*   (2006.01)
(52) U.S. Cl. ................ 267/64.27; 267/64.11; 267/122

(58) Field of Classification Search ............. 267/64.11, 267/64.23, 64.27, 64.28
See application file for complete search history.

(56) References Cited

U.S. PATENT DOCUMENTS

| | | | | |
|---|---|---|---|---|
| 5,060,916 A | * | 10/1991 | Koschinat et al. | 267/64.27 |
| 6,024,343 A | * | 2/2000 | Ebert | 267/64.27 |
| 6,527,259 B1 | * | 3/2003 | Nemeth et al. | 267/64.21 |
| 2004/0222577 A1 | | 11/2004 | Moritz et al. | |
| 2005/0236749 A1 | * | 10/2005 | Gross et al. | 267/122 |

FOREIGN PATENT DOCUMENTS

| | | |
|---|---|---|
| DE | 42 30 249 | 3/1994 |
| DE | 44 28 601 | 2/1996 |
| DE | 20 2005 006 027 | 7/2005 |

* cited by examiner

*Primary Examiner* — Lesley D Morris
*Assistant Examiner* — Shin Kim
(74) *Attorney, Agent, or Firm* — Walter Ottesen

(57) ABSTRACT

A cover assembly for an air spring for vehicles includes a cover (1) and a buffer (2) in the cover (1). The cover (1) is made from plastic and has reinforcing ribs (3) on the inside. The stop buffer (2) has slots on the side thereof facing the cover (1) in a manner corresponding to the reinforcing ribs (3) of the cover (1). The ribs (3) of the cover (1) are inserted into the slots (8). Damage to the buffer (2) by impact of the ribs (3) on the buffer (2) is thus avoided.

7 Claims, 3 Drawing Sheets

COVER ASSEMBLY FOR A VEHICLE AIR SPRING

CROSS REFERENCE TO RELATED APPLICATIONS

This application is a continuation-in-part application of international patent application PCT/EP 2007/059451, filed Sep. 10, 2007, designating the United States and claiming priority from German application 10 2006 043 957.0, filed Sep. 14, 2006, and the entire content of both applications is incorporated herein by reference.

FIELD OF THE INVENTION

The invention relates to a cover assembly for an air spring for a vehicle with the air spring having a roll-off piston, a rolling-lobe flexible member, a cover and a stop buffer.

BACKGROUND OF THE INVENTION

Air springs of the type referred to above are known per se and are used in very diverse applications. German patent publication 42 30 249 C2 discloses such an air spring with a metal cover which is connected securely in an air-tight manner to the flexible member by a flanging process. In order to avoid damage to the components with full compression of the air spring, a rubber stop buffer oriented towards the interior of the air spring is arranged on the cover. This stop buffer is fastened to a corresponding lug welded to the cover. The abutment face between the stop buffer and the cover is flat.

In U.S. patent application publication 2004/0222577, an annular stop buffer is provided which is arranged in a spring pot of metal.

The solutions disclosed have metal air-spring covers in order to transmit the occurring buffer forces to the adjacent ancillary components without damage to the cover.

For reasons of weight-saving, plastics are also increasingly used for the ancillary components (pistons and covers) which seal the air spring flexible member.

U.S. patent application publication 2005/0236749 shows a two-part air spring cover wherein the rolling-lobe flexible member is clamped between an outer cover and an inner cover of plastic with the latter being latched in the outer cover. Here too, however, the stop buffer is mounted on the metal outer cover.

If the covers are formed completely of plastic, a ribbing is preferably provided for stiffening for reasons of strength.

However, the use of a buffer in combination with the ribbed structure of the cover is problematic because, with the buffer mounted either on the piston or on the ribbed side of the cover, the buffer is destroyed by the inwardly-oriented ribs of the cover with repeated impact of the components on the buffer.

An arrangement of the ribbing of the cover on the outside of the cover is usually avoided because foreign bodies or water can collect in the cavities formed by the ribs which, in extreme cases, for example frost, can lead to the destruction of the cover. As a result, the air spring cover is usually made of metal, or is made from plastic only when an internal stop buffer is not provided.

SUMMARY OF THE INVENTION

It is an object of the invention to provide a cover assembly for an air spring which, while avoiding the above-mentioned disadvantages, has a ribbed cover of plastic even when an internal stop buffer is present.

This object is achieved in that the cover of the cover assembly of the air spring is formed from plastic with an inwardly-oriented ribbing and the stop buffer can be fastened to the cover of the air spring, with the stop buffer having slot-shaped recesses on its side oriented towards the cover. The recesses or cutouts correspond to the ribbing of the cover and the ribbing of the cover can be inserted into the slot-shaped recesses.

The slots in the buffer have a depth which is equal to or greater than the height of the ribs of the cover which are disposed therein. In this way, the impact blows to the buffer are transmitted to the base of the cover and not to the ribs thereby protecting the buffer against damage by the ribs.

This arrangement affords the advantage that the cover has a smooth outer side so that foreign bodies or water cannot collect therein. The cover can be stiffened without difficulty with suitable ribs and without the danger of premature destruction of the buffer. Destruction of the buffer is avoided because the ribs of the cover rest in the slots of the buffer and the forces from the buffer are transmitted to the cover via the parts of the buffer resting in a plane on the inner side of the cover between the ribs.

Because the buffer does not need to be mounted on the movable part of the air spring (that is, the piston), the unsuspended mass of the vehicle is smaller, and this improves driving comfort. The cover assembly is used, for example, in air springs for commercial vehicles.

BRIEF DESCRIPTION OF THE DRAWING

The invention will now be described with reference to the drawings wherein.

DESCRIPTION OF THE PREFERRED EMBODIMENTS OF THE INVENTION

Figure 1:
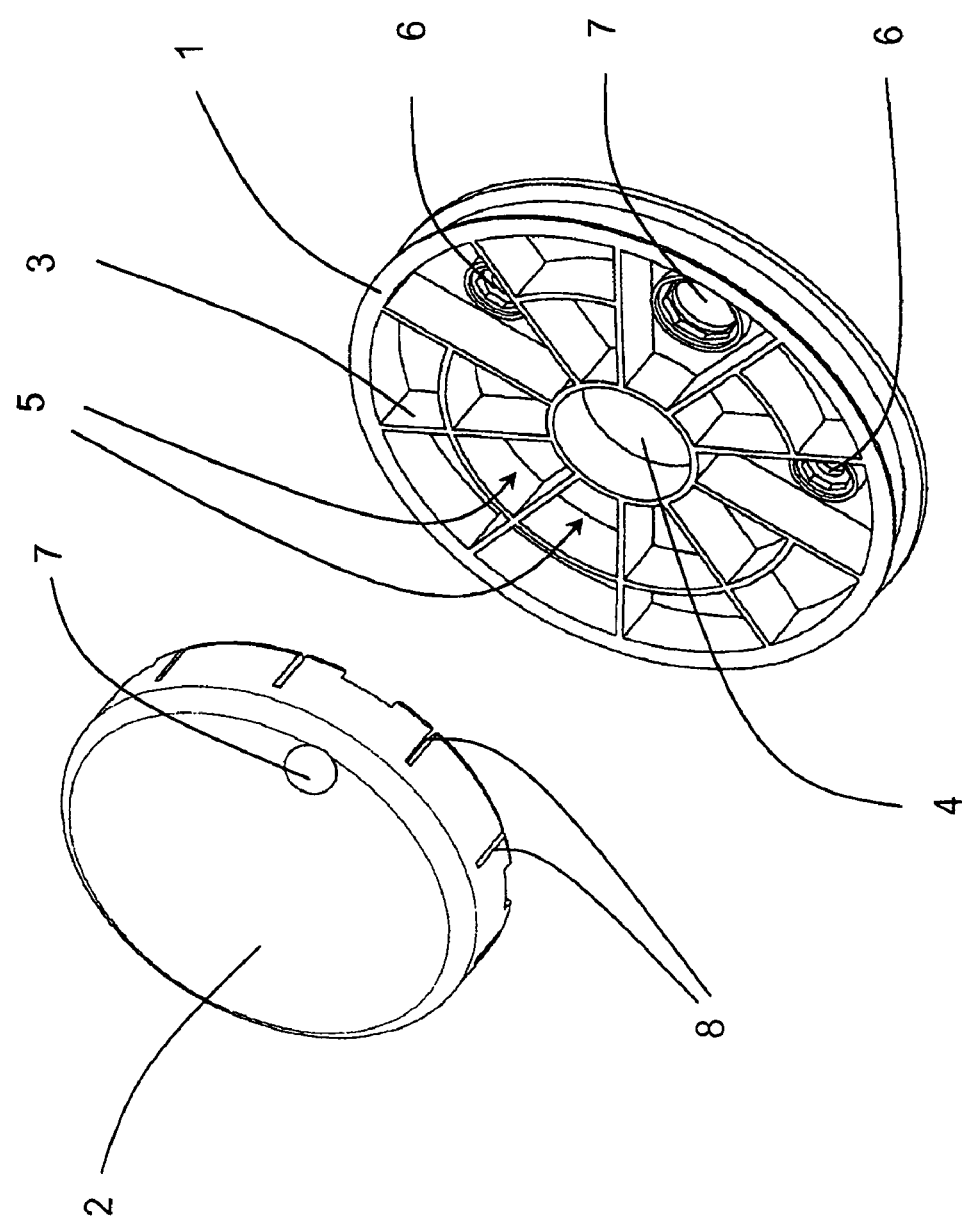
FIG. 1 shows an exploded perspective view of the air spring cover assembly of the invention.

Referring to FIG. 1, the air spring cover 1 is formed from a plastics material while the buffer 2 is of rubber. The cover 1 of the air spring cover assembly has on its side oriented towards the interior of an air spring (not shown) stiffening ribs 3 which extend axially from the base 4 of the cover 1 and form cavities 5. In addition, two fastening elements 6 and an air connection 7 are arranged in the base 4 of the cover 1.

Figure 2:
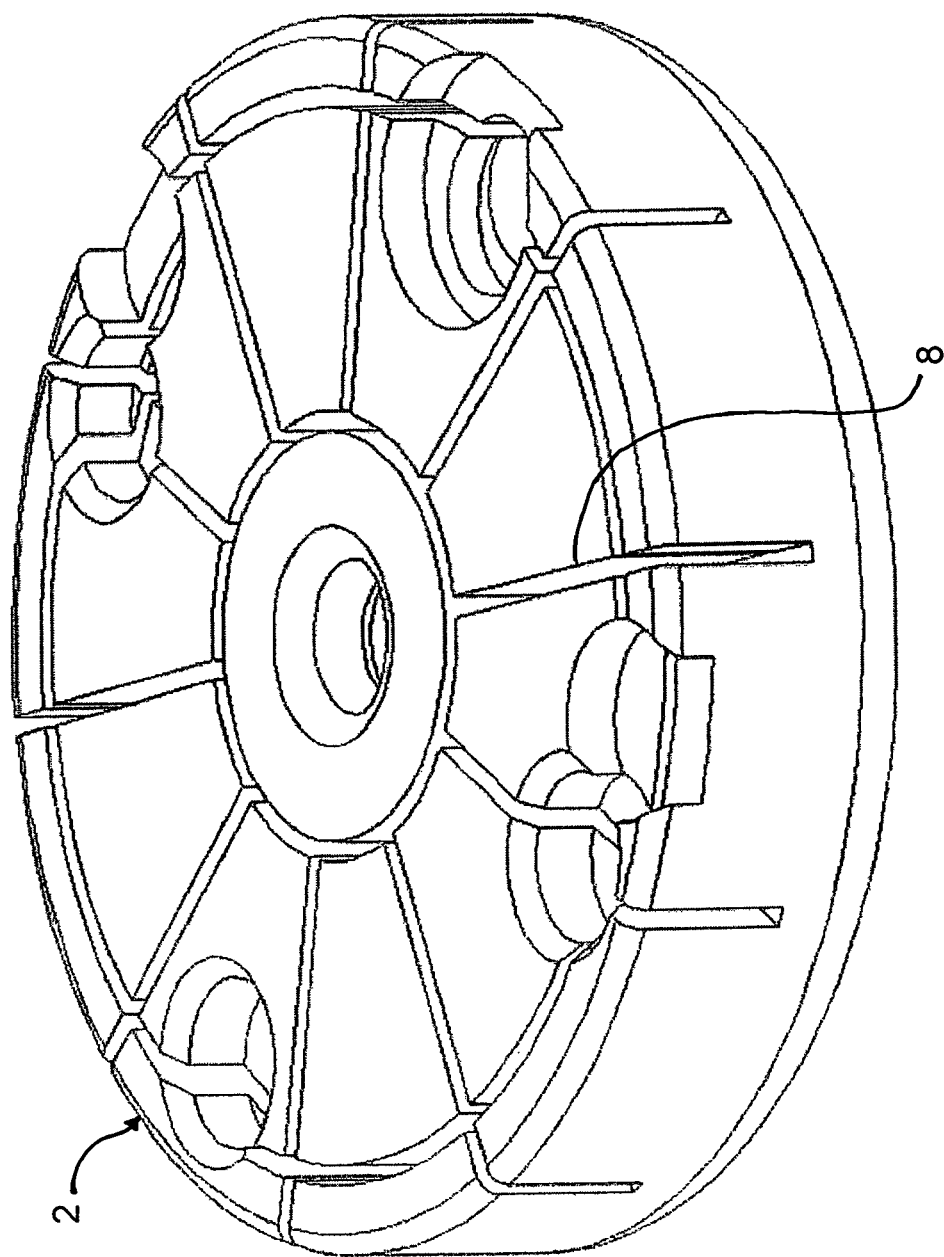
FIG. 2 is a perspective view of the buffer of the cover assembly showing the slots wherein the ribs of the cover are disposed when the buffer is mounted on the cover; and, FIG. 3 is a plan view of the buffer of FIG. 2.
Figure 3:
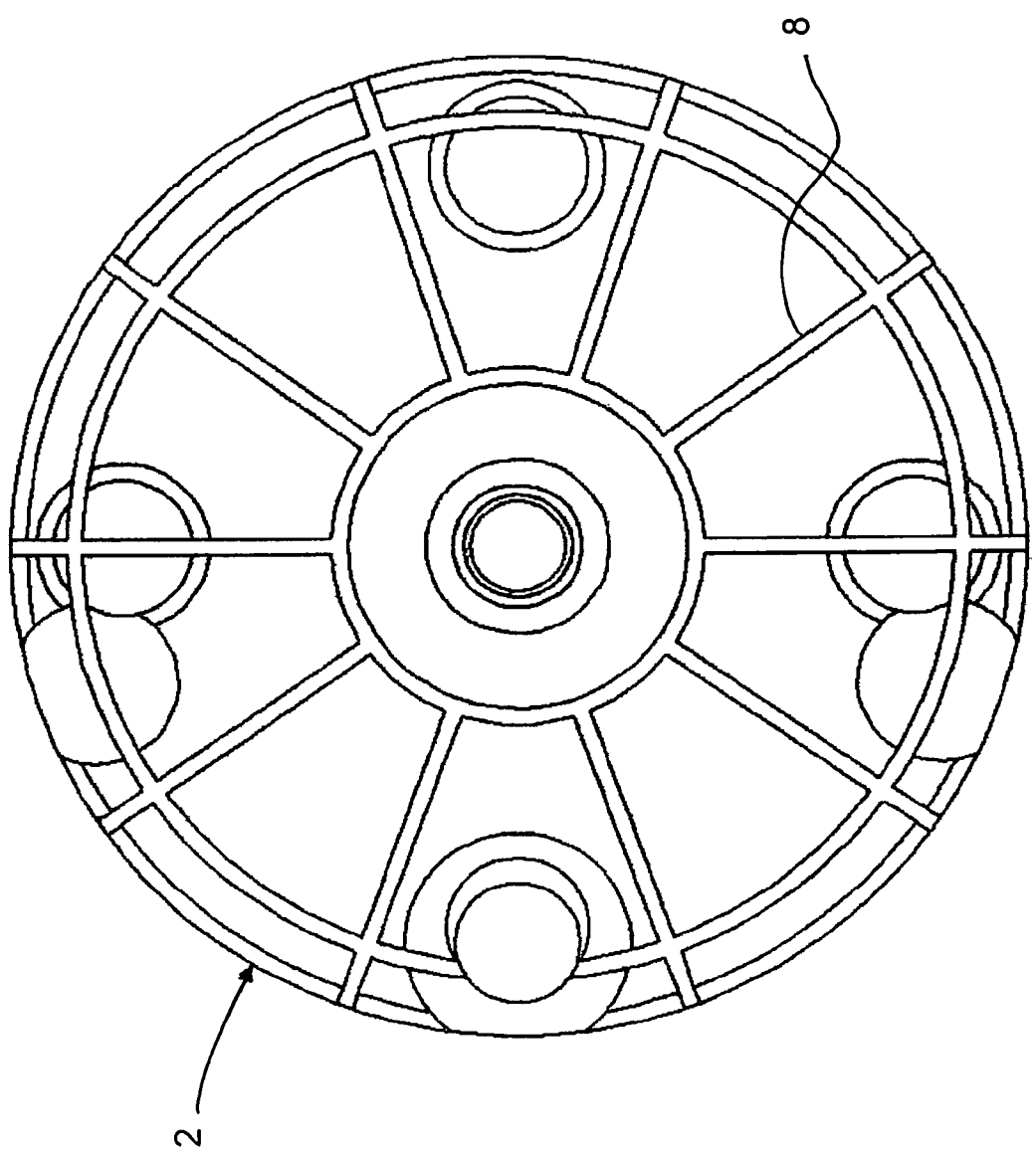

On its side oriented towards the cover, the stop buffer 2 has slot-shaped recesses 8 which correspond to the ribs 3 of the cover 1. The slot-shaped recesses 8 are shown in the perspective view of FIG. 2 and the plan view of FIG. 3. In the assembled state, the ribs 3 of the cover 1 engage in the slots 8 of the stop buffer 2 with the stop buffer 2 projecting into the cavities 5.

The buffer 2 is tightly joined to the base 4 of the cover 1 in the cavities 5 by an adhesive (not shown) and is thus secured from falling out.

It is understood that the foregoing description is that of the preferred embodiments of the invention and that various changes and modifications may be made thereto without departing from the spirit and scope of the invention as defined in the appended claims.

LIST OF REFERENCES

Relating to the Description

1 Air spring cover of plastic
2 Stop buffer

3 Stiffening ribs of air spring cover 1
4 Base of cover 1
5 Cavities of air spring cover between ribs 3
6 Fastening elements
7 Air connection
8 Slot-shaped recesses in stop buffer 2

What is claimed is:

1. A cover assembly for a rolling-lobe air spring of a vehicle, the cover assembly comprising:
   a cover made of plastic and having a base wall defining an outer side and an inner side;
   said cover having a plurality of inwardly-directed ribs formed on said inner side of said base wall;
   a stop buffer subjected to impact blows during operation of said air spring;
   said stop buffer being attached to said cover and having a side facing toward said ribs; and,
   said stop buffer having slot-shaped cutouts on said side thereof corresponding to said ribs with said ribs being disposed in corresponding ones of said slot-shaped cutouts so as to permit said impact blows to be transmitted directly to said base wall without causing damage to said stop buffer by said ribs.

2. The cover assembly of claim 1, wherein said outer side of said cover has a smooth surface to prevent foreign bodies or water from collecting on said outer side during operational use of said air spring in said vehicle.

3. The cover assembly of claim 1, wherein said stop buffer is attached to said cover with an adhesive.

4. The cover assembly of claim 1, wherein said ribs have a predetermined height measured from said base wall; and, said slot-shaped cutouts have a depth equal to or greater than said height of said ribs.

5. The cover assembly of claim 4, wherein said outer side of said cover has a smooth surface to prevent foreign bodies or water from collecting on said outer side during operational use of said air spring in said vehicle.

6. The cover assembly of claim 5, wherein said stop buffer is attached to said cover with an adhesive.

7. A cover assembly for a rolling-lobe air spring of a vehicle, the cover assembly comprising:
   a cover made of plastic and having a base wall defining an outer side and an inner side;
   said cover having a plurality of inwardly-directed ribs formed on said inner side of said base wall;
   a stop buffer subjected to impact blows during operation of said air spring;
   said stop buffer being attached to said cover and having a side facing toward said ribs;
   said stop buffer having slot-shaped cutouts on said side thereof corresponding to said ribs with said ribs being disposed in corresponding ones of said slot-shaped cutouts so as to permit said impact blows to be transmitted directly to said base wall without causing damage to said stop buffer by said ribs; and,
   said stop buffer being made of rubber.

* * * * *